United States Patent [19]
Tsuji et al.

[11] Patent Number: 6,060,179
[45] Date of Patent: May 9, 2000

[54] CU-PB ALLOY BEARING AND PRODUCING METHOD THEREFOR

[75] Inventors: Hideo Tsuji; Tatsuo Yamada; Hideo Ishikawa; Takayuki Shibayama, all of Nagoya, Japan

[73] Assignee: Daido Metal Company Ltd., Nagoya, Japan

[21] Appl. No.: 09/098,372

[22] Filed: Jun. 17, 1998

[30] Foreign Application Priority Data

Jul. 10, 1997 [JP] Japan ................................ 9-202398

[51] Int. Cl.⁷ ........................................ C22C 9/08
[52] U.S. Cl. .................. 428/644; 428/677; 428/941; 384/912
[58] Field of Search .................... 428/677, 610, 428/643, 644, 941; 384/912

[56] References Cited

U.S. PATENT DOCUMENTS 4,818,628  4/1989  Alexander et al. .
5,489,487  2/1996  Tanaka et al. .
5,666,644  9/1997  Tanaka et al. .
5,882,587  3/1999  Okamoto et al. .

FOREIGN PATENT DOCUMENTS 7179964  7/1995  Japan .

*Primary Examiner*—Deborah Jones
*Assistant Examiner*—Jason Savage
*Attorney, Agent, or Firm*—Browdy and Neimark

[57] ABSTRACT

Disclosed is a Cu—Pb alloy bearing and a producing method thereof. The Cu—Pb alloy bearing consists of a backing metal layer and a Cu—Pb bearing alloy layer which is bonded to the backing metal layer and whose matrix contains dispersed Pb-phase grains. Within an at least 30 $\mu$m thick surface region of the Cu—Pb bearing alloy layer, the Pb-phase grains comprise at least one of In and Sn in an amount or a total amount of not less than 2 wt %, respectively, which are elements added into the Pb-phase grains by migration.

5 Claims, No Drawings

CU-PB ALLOY BEARING AND PRODUCING METHOD THEREFOR

TECHNICAL FIELD OF THE INVENTION

The present invention relates to a Cu—Pb alloy bearing, more specifically the Cu—Pb alloy bearing which has excellent corrosion resistance property.

BACKGROUND OF THE INVENTION

For example, in a Cu—Pb bearing alloy which layer comprises Pb-phase grains dispersed in the Cu matrix, the Cu—Pb alloy bearing consisting of a backing metal layer and the bearing alloy layer, the Pb-phase grains are liable to be corroded by acid. Especially in the case where the Cu—Pb alloy bearing exists in an environment of a lubrication oil after a long term use, which oil is called a deteriorated oil, the Pb-phase grains are significantly liable to be corroded by acid substances comprising a chemically changed organic acid (e.g. R-COOH) present in such deteriorated oil. Even if Sn and/or In is further added in the Cu—Pb alloy for improving corrosion resistance property thereof, the Pb-phase grains are not improved in corrosion resistance property since such alloying elements are dissolved merely in the Cu matrix.

Alternatively, there has been known a composite bearing which is provided with an overlay on a bearing alloy layer in order to improve corrosion resistance property as well as conformability, the overlay being Pb-Sn, Pb-Sn-Cu, Pb-Sn-In or the like. This is on the basis of the fact that a Pb alloy comprising 2 to 10 wt % Sn and/or In has good corrosion resistance. It is noted that, if the overlay is directly provided on the bearing alloy layer, Sn and/or In in the overlay migrates into the bearing alloy layer during a heat treatment process or during operation of the engine, for example, as hereby the overlay becomes deteriorated in corrosion resistance property. Thus, the known composite bearing has been provided with an intermediate layer of Ni between the bearing alloy layer and the overlay in order to prevent migration of Sn and/or In in the overlay into the bearing alloy layer. But, since the intermediate layer of Ni is hard, in an internal combustion engine, the pressure of such a Ni layer creates the liability of occurrence of seizure between the composite bearing and the rotary shaft supported by the bearing so as to expose the hard intermediate layer of Ni when the overlay is lost by abrasion after long term operation of the engine. Further, there has been a problem that, when the overlay and a part of the intermediate layer of Ni are lost by early wear to expose the bearing alloy layer due to an uneven contact between the bearing and the rotary shaft at an early stage of engine operation, corrosion starts to progress from the exposed region.

Thus, the present inventors have previously proposed a solution to solve the above problems, which is shown in JP-A-7-179964.

JP'964 teaches a composite bearing in which an overlay of a Pb base alloy comprising 9 wt % Sn and 9 wt % In is formed directly on a Cu—Pb bearing alloy layer without an intermediate Ni layer, and which has been subjected to a diffusion heat treatment at 165° C. for approximately 1,000 hours. According to the diffusion heat treatment, indium (In) in the overlay migrates into Pb-phase grains being dispersed in the matrix of the Cu—Pb bearing alloy layer, thereby the Pb-phase grains are improved in corrosion resistance. Since the composite bearing does not comprise the above hard intermediate Ni layer, even if the overlay is lost by abrasion so as to expose the Cu—Pb bearing alloy layer, rotary shaft being supported by the bearing is not damaged by the bearing without the hard intermediate Ni layer and the Cu—Pb bearing alloy layer has good corrosion resistance because of the In-containing Pb-phase grains.

But, according to the proposal of JP'964, it is required for the diffusion heat treatment to have a long time for indium (In) migration from the overlay into the Pb-phase grains. In order to shorten the heat treatment time, typically the heat treatment temperature is raised or a content gradient is raised between the overlay and the bearing alloy layer. But, in the case where the indium (In) amount of the overlay is raised, it is rather necessary to lower the heat treatment temperature because of a lowered melting point of the overlay comprising an increased amount of indium (In). Thus, according to the prior art of JP'964, it has been required for the diffusion heat treatment to occur over a long time.

Further, according to the proposal of JP'964, it has been difficult to control the indium (In) amount in the overlay, since indium (In) migration from the overlay into the Pb-phase grains during the diffusion heat treatment lowers the indium (In) amount in the overlay.

SUMMARY OF THE INVENTION

Thus, one object of the present invention is to provide a Cu—Pb alloy bearing without an overlay, which has good corrosion resistance because of improved corrosion resistance property of its Cu—Pb bearing alloy layer and which is easily produced.

Another object of the invention is to provide another Cu—Pb alloy bearing on which an overlay is directly provided and has good corrosion resistance.

Under such objects, according to one aspect of the invention, there is provided a Cu—Pb alloy bearing consisting of a backing metal layer and a Cu—Pb bearing alloy layer which is bonded to the backing metal layer and whose matrix contains dispersed Pb-phase grains, wherein, with regard to the Cu—Pb bearing alloy layer, within an at least 30 μm thick surface region of the Cu—Pb bearing alloy layer, the Pb-phase grains comprise at least one of In and Sn in an amount or a total amount of not less than 2 wt %, respectively, which are elements added into the Pb-phase grains by migration.

Because the Pb-phase grains comprise at least one of In and Sn in a high amount or a high total amount of not less than 2 wt %, respectively, the Pb-phase grains are improved in the corrosion resistance property while those in the similar conventional bearings are liable to corrode. Thus, the invention Cu—Pb alloy bearing has good corrosion resistance even without an overlay and is readily produced because of the absense of such overlay.

The In and/or Sn diffusion region in the Cu—Pb bearing alloy layer is formed within at least 30 μm thick from the surface of the Cu—Pb bearing alloy layer. If the thickness is less than 30 μm, it is impossible for the Cu—Pb bearing alloy layer to be sufficiently improved in corrosion resistance property. An excess thickness of the diffusion region is economically disadvantageous, since the diffusion heat treatment necessitates a longer time and expensive indium (In) is non-effectively consumed in the case of indium (In) as a migration element. Thus, the thickness range is preferably from 30 μm to 300 μm, desirably from 40 μm to 200 μm.

The following is a description of alloying elements of the Cu—Pb bearing alloy.

(a) Pb: 8 to 30 wt %

If Pb is less than 8%, the Cu—Pb bearing alloy s inferior in anti-seizure property. In the case of ore than 30% of Pb, the Pb-phase grains are liable to be combined with one another such that they are hard to disperse in the matrix of the Cu—Pb bearing alloy, and further the Cu—Pb bearing alloy is deteriorated in strength. Thus, the amount of Pb is preferably 8 to 30 wt %.

(b) Sn: 0.5 to 8 wt %

If Sn is less than 0.5%, the Cu—Pb bearing alloy will have low strength. On the other hand, if Sn exceeds 8%, the Cu—Pb bearing alloy becomes too hard and brittle and is lowered in thermal conductivity to be deteriorated in anti-seizure property. Thus, the amount of Sn is preferably 0.5 to 8wt %.

(c) P (phosphorous): not more than 0.2 wt %

If phosphorous (P) exceeds 0.2%, the Cu—Pb bearing alloy becomes too hard so as to be deteriorated in conformability to a mating shaft. Thus, the amount thereof is preferably not more than 0.2 wt %.

(d) Ni: If 1 to 20 wt % Ni is added to the Cu—Pb bearing alloy, a reaction product layer by migration of In and/or Sn is restrained from being formed around the respective Pb-phase grains, the reaction product layer being an intermetallic compound of Cu-Sn or Cu-Sn-In and preventing In and/or Sn from migrating into the Pb-phase grains. Thus it is preferable to add Ni into the Cu—Pb bearing alloy in order to promote migration of In and/or Sn into the Pb-phase grains in the diffusion region of the Cu—Pb bearing alloy for easily increasing the concentration of In and/or Sn in the Pb-phase grains. It is noted that, in the case of less than 1 wt % Ni, such effect of restraining formation of the intermetallic compound of Cu-Sn or Cu-Sn-In cannot be obtained. On the other hand, if the Cu—Pb bearing alloy comprises an excess amount of Ni, it is deteriorated in conformability to the mating shaft, the Cu—Pb bearing alloy being required to have such conformability. Especially, such tendency of deterioration becomes extraordinary in the case of more than 20 wt % Ni. Thus, if in the case of adding Ni into the Cu—Pb bearing alloy, not more than 20 wt % Ni is preferable, desirably 1 to 15 wt % Ni.

According to another aspect of the invention, there is provided a method of producing a Cu—Pb alloy bearing, wherein the method comprises the following steps of preparing a starting composite material consisting of a backing metal layer and a Cu—Pb bearing alloy layer which is bonded to the backing metal layer and whose matrix contains dispersed Pb-phase grains; providing one or more plating layers of In and Sn onto the surface of the Cu—Pb bearing alloy layer; subjecting the plated composite material to diffusion treatment by heating thereby causing the plating material to migrate into the Cu—Pb bearing alloy layer so as to obtain the Cu—Pb alloy bearing in which, within an at least 30 $\mu$m thick surface region of the Cu—Pb bearing alloy layer, the Pb-phase grains comprise at least one of In and Sn in an amount or a total amount of not less than 2 wt %, respectively.

When the heat treatment is performed for the above intervening material of the backing metal layer and the Cu—Pb bearing alloy layer on which one or more plating layers of In and Sn are provided, because of a high amount difference of In and/or Sn between the plating layer(s) and the Cu—Pb bearing alloy layer, In and/or Sn migrates rapidly into the Cu—Pb bearing alloy layer to form the diffusion region in a short time.

The backing metal layer is preferably made from steel, to which the Cu—Pb bearing alloy layer is bonded. The backing metal is prepared preferably in a state as cleansed or as plated with copper for reliable bonding to the Cu—Pb bearing alloy layer.

The plating layer of In and/or Sn is formed to have a thickness of 0.5 to 5.0 $\mu$m by means of the usual electroplating method or the PVD process (Physical Vapor Deposition), for example. If both elements of In and Sn are desired for forming the diffusion region, an In-Sn alloy plating layer is acceptable for the purpose, which can be formed by the PVD process. However, according to the electroplating method, preferably superimposed two layers of In and Sn are formed on the Cu—Pb bearing alloy layer, since it is difficult to form an alloy plating layer of In and Sn by electroplating.

If the thickness of the plating of In and/or Sn is less than 0.5 $\mu$m, it is impossible to provide the respective Pb-phase grains with a sufficient amount of In and/or Sn. If the above thickness is not less than 10 $\mu$m, the residual amount of In and/or Sn plating after the diffusion treatment increases so as to be uneconomical.

In the diffusion treatment of the plated composite material, In and/or Sn of the plating layer migrates preferentially into the Pb-phase grains in the Cu—Pb bearing alloy layer to form a diffusion region in the Cu—Pb bearing alloy layer. The diffusion region has preferably a thickness range of 30 $\mu$m to 300 $\mu$m from the outer surface toward the inner surface, adjacent to the backing metal layer, of the Cu—Pb bearing alloy layer, and has the Pb-phase grains comprising at least one of In and Sn in an amount or a total amount of not less than 2 wt %. Because of a rather high content of In and/or Sn, the Pb-phase grains can have improved corrosion resistance.

In the case where the plating layer still remains on the Cu—Pb bearing alloy layer after the diffusion heat treatment, it may be removed by way of electrolytic pickling or machining, for example. Of course, the plating layer may partially remain on the Cu—Pb bearing alloy layer so that it contributes to improving the bearing in the corrosion resistance property and the initial conformability to a mating shaft.

While higher temperature is preferable for the diffusion heat treatment, it is recommended to be within a temperature range at which the plating material does not molt or only partially melts. If the plating material fully melts, it unintentionally flows on the surface of the Cu—Pb bearing alloy layer resulting in an uneven thickness distribution of the diffusion region .

According to one feature of the invention, there is provided a Cu—Pb alloy bearing which consists of a backing metal layer, a Cu—Pb bearing alloy layer which is bonded to the backing metal layer and whose matrix contains dispersed Pb-phase grains, and an overlay on the Cu—Pb bearing alloy layer, wherein the Cu—Pb bearing alloy layer essentially consists of 8 to 30 wt % Pb, 0.5 to 8 wt % Sn, not more than 0.2 wt % P, and balance of Cu and unavoidable impurities, in which, within an at least 30 $\mu$m thick surface region of the Cu—Pb bearing alloy layer, the Pb-phase grains comprise at least one of In and Sn in an amount or a total amount of not less than 2 wt %, respectively, which are elements added into the Pb-phase grains by migration; and the overlay consists of any one of a Pb base alloy and a Sn bas e alloy.

The overlay on the Cu—Pb bearing alloy layer improves the bearing in the initial conformability to a mating shaft and in corrosion resistance. On the other hand, even if the overlay is lost due to abrasion to expose the diffusion region of the Cu—Pb bearing alloy layer, any seizure is unlikely to occur because of the bearing lacking a hard intermediate Ni layer, i.e. the bearing is not deteriorated in the anti-seizure property. The exposed Cu—Pb bearing alloy layer is not quickly corroded because of the diffusion region being excellent in corrosion resistance, thus the bearing has excellent corrosion resistance for a long term.

Especially, even if the overlay is soon worn during the initial preliminary operation due to an uneven contact with a mating shaft, the exposed Cu—Pb bearing alloy layer is restrained from being quickly corroded because of the diffusion region being excellent in corrosion resistance.

The overlay is optionally made from a known alloy selected from Pb base alloys and Sn base alloys which are a Pb base alloy typically such as a Pb-9Sn-9In alloy (which comprises 9 wt % Sn and 9 wt % In), a Pb-9Sn-9In-2Cu alloy or a Pb-8Sn-2Cu alloy, and a Sn base alloy typically such as a Sn-2Cu alloy, a Sn-7Sb alloy or a Sn-2Cu-7Sb alloy.

According to one feature of the method of producing the Cu—Pb alloy bearing, the bearing is provided with an overlay of a Pb base alloy or a Sn base alloy. In this case, it is noted that, if the overlay of a Pb base alloy is formed on the Cu—Pb bearing alloy layer on which one or more plating layers of In and Sn partially remain, a low melting point alloy layer is formed due to a reaction between the residual plating layer and a Pb component of the Pb base alloy of the overlay such that an undesirable wiping phenomenon may readily occur. Thus, it is preferable to form the overlay on the Cu—Pb bearing alloy layer after removing such residual plating layer by means of electrolytic pickling or machining.

The above stated invention of the Cu—Pb alloy bearing has excellent corrosion resistance without the overlay, which consists of a backing metal layer and a Cu—Pb bearing alloy layer which is bonded to the backing metal layer and whose matrix contains dispersed Pb-phase grains, wherein, with regard to the Cu—Pb bearing alloy layer, within an at least 30 μm thick surface region of the Cu—Pb bearing alloy layer, the Pb-phase grains comprise at least one of In and Sn in an amount or a total amount of not less than 2 wt %, respectively, which are elements added into the Pb-phase grains by migration.

According to another feature of the invention, there is provided a method of producing the Cu—Pb alloy bearing, wherein the method comprises the following steps of preparing a starting composite material consisting of a backing metal layer and a Cu—Pb bearing alloy layer which is bonded to the backing metal layer and whose matrix contains dispersed Pb-phase grains; providing one or more plating layers of In and Sn onto the surface of the Cu—Pb bearing alloy layer; and subjecting the plated composite material to diffusion treatment by heating thereby causing the plating material to migrate into the Cu—Pb bearing alloy layer so as to obtain the Cu—Pb alloy bearing in which, within an at least 30 μm thick surface region of the Cu—Pb bearing alloy layer, the Pb-phase grains comprising at least one of In and Sn in an amount or a total amount of not less than 2 wt %, respectively. It is noted that the bearing having excellent corrosion resistance is produced by the diffusion heat treatment of a short time.

According to still another feature of the invention, there is provided a Cu—Pb alloy bearing which consists of a backing metal layer, a Cu—Pb bearing alloy layer which is bonded to the backing metal layer and whose matrix contains dispersed Pb-phase grains and an overlay on the Cu—Pb bearing alloy layer, wherein the Cu—Pb bearing alloy layer essentially consists of 8 to 30 wt % Pb, 0.5 to 8 wt % Sn, not more than 0.2 wt % P, and balance of Cu and unavoidable impurities, in which, within an at least 30 μm thick surface region of the Cu—Pb bearing alloy layer, the Pb-phase grains comprise at least one of In and Sn in an amount or a total amount of not less than 2 wt %, respectively, which are elements added into the Pb-phase grains by migration; and the overlay consists of any one of a Pb base alloy and a Sn base alloy. The Cu—Pb alloy bearing is excellent in corrosion resistance because of the overlay. It is noted that, even if the overlay is soon worn during the initial preliminary operation due to an uneven contact with a mating shaft, the exposed Cu—Pb bearing alloy layer is restrained from being rapidly corroded because of the diffusion region being excellent in corrosion resistance.

According to still another feature of the invention, there is provided a method of producing the Cu—Pb alloy bearing comprises the following steps of preparing a starting composite material consisting of a backing metal layer and a Cu—Pb bearing alloy layer which is bonded to the backing metal layer and whose matrix contains dispersed Pb-phase grains; providing one or more plating layers of In and Sn onto the surface of the Cu—Pb bearing alloy layer; subjecting the plated composite material to diffusion treatment by heating thereby causing the plating material to migrate into the Cu—Pb bearing alloy layer so that, within an at least 30 μm thick surface region of the Cu—Pb bearing alloy layer, the Pb-phase grains comprise at least one of In and Sn in an amount or a total amount of not less than 2 wt %, respectively; and providing an overlay on the Cu—Pb bearing alloy layer after the diffusion treatment, which consists of any one of a Pb base alloy and a Sn base alloy.

The bearing having excellent corrosion resistance is produced by the diffusion heat treatment of a short time. Even if the overlay is worn to expose the Cu—Pb bearing alloy layer, the bearing has excellent wear resistance for a long term, because of the diffusion region of the Cu—Pb bearing alloy layer having excellent anti-seizure property and corrosion resistance.

An experiment was performed with regard to invention and comparative examples as follows.

EXAMPLE

Three kinds of specimen material were prepared by the following process, each of which comprises a backing steel plate and a Cu—Pb bearing alloy layer. For the Cu—Pb bearing alloy layers, three types of Cu—Pb bearing alloy were used, which comprise no Ni, 2 wt % Ni and 5 wt % Ni, respectively (see the attached Table 1). More specifically, a first type Cu—Pb bearing alloy consists of, by weight, 2% Sn, 22% Pb, 0.02% P (phosphorous) and balance of Cu and unavoidable impurities, a second type Cu—Pb bearing alloy consists of, by weight, 2% Sn, 22% Pb, 2% Ni, 0.02% P (phosphorous) and balance of Cu and unavoidable impurities, and a third type Cu—Pb bearing alloy consists of, by weight, 2% Sn, 22% Pb, 5% Ni, 0.02% P (phosphorous) and balance of Cu and unavoidable impurities. The backing steel plates were provided with a copper plating layer having a thickness of 8 μm, respectively.

(1) A Cu—Pb alloy powder was spread onto the backing steel plate being provided with a Cu plating layer.

(2) It was subjected to a heat treatment at a temperature of 700° C. to 900° C. for 10 to 30 minutes in a furnace having a reducing atmosphere in order to sinter the Cu—Pb alloy powder.

(3) The thus obtained composite metal material was subjected to roll-working, and subsequently again sintered and roll-worked to obtain a bimetal material. The bimetal material has a thickness of 1.6 mm, which comprises a 0.35 mm thick Cu—Pb bearing alloy layer and a 1.25 mm thick backing steel plate layer.

(4) The bimetal material was cut to produce a plurality of plates each having a rectangular shape. The cut bimetal plates were subjected to bending and necessary machining processes to produce hemi-circular plain bearings.

(5) The hemi-circular plain bearings were subjected to a preliminary treatment prior to electroplating, which included de-greasing water cleaning, electrolytic de-greasing and pickling in this order.

(6) The respective cleaned hemi-circular plain bearing was subjected to electroplating to form a two plating layers consists of a first plating layer (or an under plating layer) of Sn and a second plating layer (or an upper plating layer) of indium (In).

(7) The plated hemi-circular plain bearing was subjected to a diffusion treatment at 165° C. of temperature by which Sn and In elements of the plating layer migrate into Pb-phase grains comprised in the Cu—Pb bearing alloy layer so as to produce a diffusion region in Cu—Pb bearing alloy layer.

(8) A residual plating layer of In and/or Sn was removed from the body of the hemi-circular plain bearing by way of electrolytic pickling to obtain a test specimen consisting of two layers.

The thus prepared test specimens of the hemi-circular plain bearing are raised in Table 1, which can be distinguished with one another by the Items of "Ni amount in the Cu—Pb bearing alloy layer" and "Thickness of the plating layer", and which are classified generally two types of "Invention Example" and "Comparative Example".

In the test specimens, invention examples No. 5 to No. 12 and comparative examples No. 7 to No. 9 were provided with an overlay by plating having a thickness of 20 μm, respectively, whose chemical compositions are shown in Table 1. However, regarding respective comparative examples No. 7 to No. 9, when forming the overlay, at first a Pb-9Sn-9In-1Cu alloy (by weight percent) layer having a thickness of 20 μm is plated on the bimetal bearing as stated above, and thereafter the plated bearing is subjected to a diffusion treatment by heating for 1,000 hours while partially leaving the plating layer on the bimetal bearing. The left plating layers as overlay have chemical compositions shown in Table 1, respectively (see comparative examples No. 7 to No. 9).

According to the result of the diffusion treatment of the specimens, regarding comparative examples No. 7 to No. 9 which are also of the conventional method, it has been found that the diffusion region in the Cu—Pb bearing alloy layer has a very small thickness (namely, a diffusion depth) of 20 to 70 μm even after 1,000 hours heat treatment and that the thickness is greatly related to the Ni amount of the Cu—Pb bearing alloy layer. Regarding comparative examples No. 1 to No. 6, those diffusion region had a smaller thickness of 10 to 20 μm due to a short term diffusion treatment.

On the other hand, with regard to respective invention examples No. 1 to No. 12, the diffusion region had a thickness of not less than 30 μm. It has been also found from invention examples No. 4, No. 8 and No. 11 that the Ni amount in the Cu—Pb bearing alloy layer has an effect on the thickness of the diffusion region.

A corrosion test was also carried out with regard to the invention and comparative examples. In the corrosion test, with utilization of a deteriorated oxidized lubrication oil from a taxi which had already run for a distance of 10,000 km, all example specimens were dipped in the lubrication oil at 130° C. for 1,000 hours. As a result of the corrosion test, there are shown "Lost weight by corrosion" of the example specimens in Table 1, each of which is a difference between weights per surface area of the respective specimens prior to and after the corrosion test.

From the above corrosion test, the comparative example specimens No. 1 to No. 7, whose thickness ranges of diffusion region were from 10 to 20 μm, shown a high value of lost weight by corrosion, respectively. In the case of example specimens, each of which had a thickness of diffusion region of not less than 30 μm, shown a low value of lost weight by corrosion, respectively, which was around 1 mg/cm$^2$.

TABLE 1

| Specien No. | | Ni amount in the Cu—Pb bearing alloy layer (wt %) | Thickness of the plating layer Sn (μm) | Thickness of the plating layer In (μm) | Term of diffusion treatment (Hr) | Thickness of the diffusion region (μm) | Chemical composition of overlay (wt %) | Result of corrosion test Lost weight by corrosion (mg/cm$^2$) Without overlay | Result of corrosion test Lost weight by corrosion (mg/cm$^2$) With overlay |
|---|---|---|---|---|---|---|---|---|---|
| Invention Example | 1 | 0 | 2.0 | — | 24 | 40 | | 1.2 | |
| | 2 | 0 | — | 2.0 | 24 | 50 | | 1.1 | |
| | 3 | 2 | 2.0 | 2.0 | 24 | 75 | | 1.2 | |
| | 4 | 5 | 2.0 | 3.0 | 24 | 85 | | 0.9 | |
| | 5 | 0 | 1.0 | 2.0 | 24 | 60 | Pb-9Sn-9In | 1.1 | 0.5 |
| | 6 | 0 | 2.0 | 1.0 | 24 | 55 | Pb-9Sn-9In-2Cu | 1.1 | 0.5 |
| | 7 | 0 | 2.0 | 2.0 | 24 | 60 | Pb-8Sn-2Cu | 1.0 | 0.5 |
| | 8 | 2 | 2.0 | 3.0 | 24 | 80 | Pb-9Sn-9In | 1.0 | 0.4 |
| | 9 | 0 | 3.0 | 1.0 | 24 | 60 | Pb-9Sn-9In-2Cu | 1.2 | 0.4 |
| | 10 | 0 | 1.0 | 3.0 | 24 | 65 | Pb-8Sn-2Cu | 1.0 | 0.4 |
| | 11 | 0 | 2.0 | 3.0 | 24 | 70 | Sn-2Cu | 0.9 | 0.4 |
| | 12 | 0 | 2.0 | 3.0 | 24 | 70 | Sn-7Sb | 1.0 | 0.3 |
| Comparative Example | 1 | 0 | 0.5 | 0.5 | 1 | 10 | | 12.2 | |
| | 2 | 0 | 0.5 | 0.5 | 10 | 15 | | 9.8 | |
| | 3 | 0 | 1.0 | 0.5 | 10 | 20 | | 10.0 | |
| | 4 | 0 | 2.0 | 2.0 | 1 | 10 | | 11.2 | |
| | 5 | 0 | 1.0 | — | 1 | 10 | | 12.2 | |
| | 6 | 0 | — | 1.0 | 1 | 10 | | 13.5 | |
| | 7 | 0 | — | — | 1000 | 20 | (Pb-1.1Sn-2.1In) | 4.6 | 0.5 |

TABLE 1-continued

| Specien No. | Ni amount in the Cu—Pb bearing alloy layer (wt %) | Thickness of the plating layer | | Term of diffusion treatment (Hr) | Thickness of the diffusion region (μm) | Chemical composition of overlay (wt %) | Result of corrosion test Lost weight by corrosion (mg/cm²) | |
|---|---|---|---|---|---|---|---|---|
| | | Sn (μm) | In (μm) | | | | Without overlay | With overlay |
| 8 | 2 | — | — | 1000 | 50 | (Pb-1.1Sn-2.2In) | 1.2 | 0.4 |
| 9 | 5 | — | — | 1000 | 70 | (Pb-1.2Sn-2.3In) | 1.0 | 0.4 |

What is claimed is:

1. A Cu—Pb alloy bearing without overlay consisting of a backing metal layer and a Cu—Pb bearing alloy layer which is bonded to the backing metal layer and whose matrix contains dispersed Pb-phase grains, and optionally a non-overlay plating layer of at least one of In and Sn having a maximum thickness of 5.0 μm wherein:

with regard to the Cu—Pb bearing alloy layer, within an at least 30 μm thick surface region of the Cu—Pb bearing alloy layer, the Pb-phase grains comprise at least one of In and Sn in an amount or a total amount of not less than 2 wt %, respectively, which are elements added into the Pb-phase grains by migration.

2. A Cu—Pb alloy bearing according to claim 1, wherein the Cu—Pb bearing alloy layer comprises 1 to 20 wt % Ni.

3. A Cu—Pb alloy bearing consisting of a backing metal layer, a Cu—Pb bearing alloy layer which is bonded to the backing metal layer and whose matrix contains dispersed Pb-phase grains, a plating layer over the bearing layer and an overlay over the plating layer, wherein:

the Cu—Pb bearing alloy layer essentially consists of 8 to 30 wt % Pb, 0.5 to 8 wt % Sn, not more than 0.2 wt % P, and balance of Cu and unavoidable impurities, in which, within an at least 30 μm thick surface region of the Cu—Pb bearing alloy layer, the Pb-phase grains comprise at least one of In and Sn in an amount or a total amount of not less than 2 wt %, respectively, which are elements added into the Pb-phase grains by migration; and the overlay consists of any one of a Pb base alloy and a Sn base alloy.

4. A Cu—Pb alloy bearing according to claim 3, wherein the overlay is made of a Pb base alloy which essentially consists of 0.1 to 8 wt % Sn, at least one of not more than 15 wt % In and not more than 5 wt % Cu, and balance of Pb and unavoidable impurities.

5. The bearing of claim 3 wherein said overlay is a Sn base overlay.

* * * * *